United States Patent [19]

Kruncos

[11] Patent Number: 4,950,983
[45] Date of Patent: Aug. 21, 1990

[54] TACHOMETER SIGNAL CONDITIONING CIRCUIT

[75] Inventor: Francis E. Kruncos, Fond du Lac, Wis.

[73] Assignee: Brunswick Corporation, Skokie, Ill.

[21] Appl. No.: 391,449

[22] Filed: Aug. 9, 1989

[51] Int. Cl.[5] .............................................. G01P 3/54
[52] U.S. Cl. .................................. 324/169; 307/268
[58] Field of Search ............... 324/166, 168, 169, 170, 324/225; 307/268, 309; 328/5

[56] References Cited

U.S. PATENT DOCUMENTS 4,637,991  8/1987  Kruncos .............................. 324/169

Primary Examiner—Reinhard J. Eisenzopf
Assistant Examiner—Walter Snow
Attorney, Agent, or Firm—Andrus, Sceales, Starke & Sawall

[57] ABSTRACT

A tachometer signal conditioning circuit (20) includes a timer circuit (48) responsive to ignition pulses from the primary lead (28) of an internal combustion engine ignition coil (26), and outputting a timing pulse terminating after a given time delay interval during which RFI, EMI and other transients on the primary lead (28) are ignored. A one shot monostable multivibrator circuit (56) responds to the trailing edge of the timing pulse and outputs a trigger pulse of given duration. A switch circuit (66) is connected to the battery circuit (22) and is turned on by the leading edge of the trigger pulse and turned off by the trailing edge of the trigger pulse, all before the next ignition pulse. The switch circuit (66) has a node (80) providing an input for a standard low voltage tachometer (82). Conductive and nonconductive states of the switch circuit (66) change the battery circuit voltage at the node (80) at a frequency corresponding to the frequency of the ignition pulses.

7 Claims, 1 Drawing Sheet

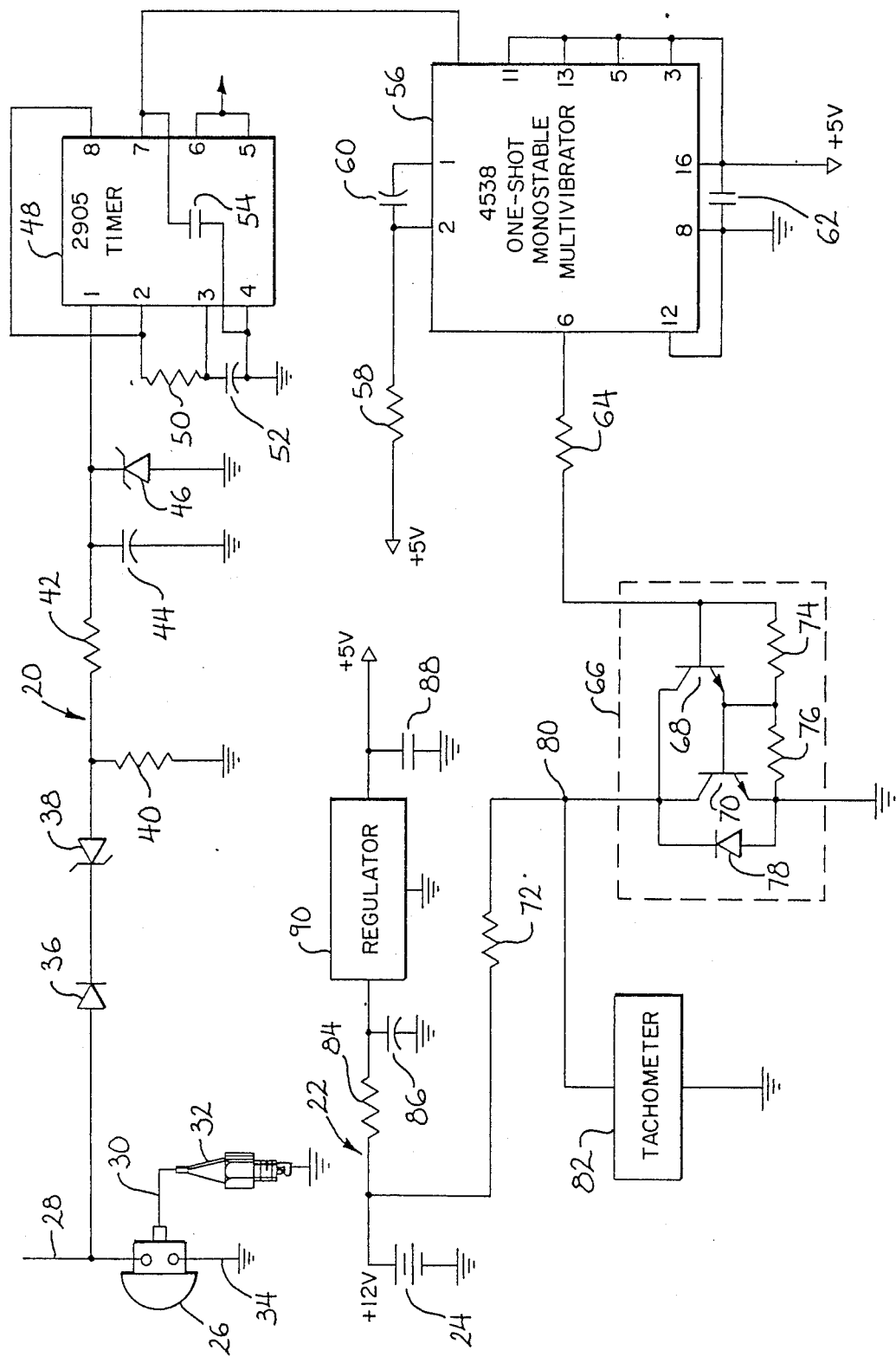

TACHOMETER SIGNAL CONDITIONING CIRCUIT

BACKGROUND AND SUMMARY

The invention relates to a tachometer signal invention relates conditioning circuit for an internal combustion engine having a battery circuit and an ignition coil with a primary low voltage lead and a secondary high voltage lead.

The invention arose during efforts to develop a reliable and widely usable tachometer for marine drive engines, including racing applications. In high performance marine engines, the use of nonsuppression spark plugs and leads have caused tachometer problems, particularly RFI (radio frequency interference), EMI (electromagnetic interference), and other transients. The present invention addresses and solves this problem.

The invention adapts most standard tachometers to most ignition coils. The invention converts the ignition pulse on the primary lead of the coil to a tachometer signal transitioning between ground and a voltage level in the range of battery voltage, which signal is readily usable in most standard tachometers. The ignition coil converts a low voltage such as 140 volts on its primary lead to a high voltage such as thousands of volts on its secondary lead supplying spark plug voltage. The low voltage on the primary lead, e.g. 140 volts, is still too high for use in standard low voltage tachometers. The present invention allows the primary lead voltage to operate a low voltage tachometer, e.g. less than 12 volts.

The invention cleans up noisy signals such as caused by point bounce in breaker point systems. The invention eliminates the above noted RFI and EMI problems. When used with a high performance marine battery capacitor discharge ignition system, the invention eliminates the requirement for a special reverse polarity tachometer and allows the use of a standard tachometer connected to the 140 volt primary lead of the ignition coil that has an extremely fast rise time and short duration. The invention enables a single standard tachometer to be left in the dash if engines and ignition systems are changed. The invention also allows for usage of various makes of tachometers because of the readily usable tachometer input signal provided by the invention.

BRIEF DESCRIPTION OF THE DRAWING

The sole drawing figure is a circuit diagram of a tachometer signal conditioning circuit constructed in accordance with the invention.

DETAILED DESCRIPTION

There is shown in the drawing a tachometer signal conditioning circuit 20 for an internal combustion engine having a battery circuit 22 with a battery 24, and an ignition coil 26 with a primary low voltage lead 28 and a secondary high voltage lead 30 supplying voltage for spark plug 32. The coil is grounded at 34.

Ignition pulses from primary lead 28 are half wave rectified by diode 36. Signals below a given threshold voltage are blocked by zenner diode 38. The signal voltage is then dropped by the voltage divider network provided by resistors 40 and 42, and filtered by capacitor 44 and regulated by zener diode 46. The ignition pulses are then input to a timer 48 provided by a 2905 precision timer, where manufacturer assigned pin number designations are shown to facilitate understanding. Timer 48 has an input pin 1 responsive to ignition pulses from the coil primary lead. Output pin 7 immediately transitions low in response to the ignition pulse, and then transitions back high after a given time delay interval during which RFI, EMI and other transients on the primary lead are ignored. In the preferred embodiment, the given time delay interval of the output timing pulse on pin 7 is 1.5 milliseconds, which is set by the RC network provided by resistor 50 and capacitor 52. Capacitor 54 provides an rf bypass filter. The output timing pulse on pin 7 thus has a leading falling edge, and a trailing rising edge occuring 1.5 milliseconds after the leading edge.

The trailing rising edge of the noted timing pulse triggers a one shot monostable multivibrator 56, provided by a 4538 one shot monostable multivibrator, where manufacturer assigned pin number designations are shown to facilitate understanding. One shot monostable multivibrator 56 has an input pin 4 responsive to output pin 7 of timer 48, and has an output pin 6 outputting an output trigger pulse substantially immediately upon receipt of the trailing rising edge of the timing pulse from pin 7 of timer 48. The time duration of the trigger pulse at output pin 6 is set by the RC network provided by resistor 58 and capacitor 60, and is chosen according to engine rpm. In the preferred embodiment, for marine racing engines having engine speeds typically approaching 8,000 to 9,000 rpm, the time duration of the trigger pulse on output pin 6 is 0.1 milliseconds, which is an order of magnitude less then the time duration of the timing pulse on output pin 7 of timer 48. Capacitor 62 provides an rf bypass filter.

The trigger pulse from output pin 6 of one shot monostable multivibrator 56 is supplied through resistor 64 and triggers switch 66, which is provided by a 2N6388 Darlington connected bipolar transistor pair. The trigger signal base drives transistor 68 into conduction which in turn base drives transistor 70 into conduction which completes a conductive circuit path from battery circuit 22 through current limiting resistor 72 through conductive transistor 70 to ground. Base to emitter resistors 74 and 76 prevent false triggering of the transistors, and diode 78 permits reverse inductive dissipation. A node 80 is provided between the collector of transistor 70 and battery circuit 22 and provides an input for tachometer 82, which is a Mercury Marine Tachometer Part No. 79 19000 Al. The battery circuit also includes a power supply provided by a current limiting resistor 84, filter capacitors 86 and 88, and a voltage regulator 90 provided by a 7805 voltage regulator, providing a 5 volt supply.

In operation, an ignition pulse on primary lead 28 of coil 26 causes output pin 7 of timer 48 to substantially immediately transition low. After the noted 1.5 millisecond time delay interval, output pin 7 of timer 48 transitions back high. The trailing rising edge of the timing pulse from pin 7 of timer 48 causes output pin 6 of one shot monostable multivibrator 56 to transition high for 0.1 milliseconds. The leading rising edge of the trigger pulse from output pin 6 of one shot monostable multivibrator 56 triggers switch 66 into conduction which grounds node 80 through conductive transistor 70. The battery circuit voltage at node 80 thus decreases and transitions to zero. At the end of the 0.1 millisecond trigger interval, the trigger pulse on output pin 6 of one shot monostable multivibrator 56 transitions low, thus removing the base drive trigger signal from switch 66, such that the latter becomes nonconductive and blocks current flow through transistor 70, whereupon the battery circuit voltage at node 80 increases and transitions back high to a voltage which is less than the battery voltage, as reduced by resistor 72. The conductive and nonconductive states of switch 66 change the battery circuit voltage at node 80 at a frequency corresponding to the frequency of ignition pulses on primary lead 28. The voltage at node 80 transitions twice for each ignition pulse. Both transitions occur between successive ignition pulses. After an ignition pulse, the voltage at node 80 transitions low and then back high before the occurence of the next ignition pulse. The transitions of the voltage level at node 80 provide the tachometer input signal for tachometer 82.

It is recognized that various equivalents, alternatives and modifications are possible within the scope of the appended claims.

I claim:

1. A tachometer signal conditioning circuit for an internal combustion engine having a battery circuit, and an ignition coil with a primary low voltage lead and a secondary high voltage lead, comprising a timer circuit having an input responsive to ignition pulses from said primary lead, and having an output outputting a timing pulse terminating after a given time delay interval during which RFI, EMI and other transients on said primary lead are ignored, a one shot monostable multivibrator circuit having an input responsive to said output of said timer circuit, and having an output outputting a trigger pulse at the termination of said timing pulse from said timer circuit after said given time delay interval, a switch circuit connected to said battery circuit and actuated to a given state by said trigger pulse from said one shot monostable multivibrator circuit, said switch circuit having a node providing a tachometer input, said given state of said switch circuit changing the battery circuit voltage at said node at a frequency corresponding to the frequency of said ignition pulses.

2. The invention according to claim 1 wherein said timing pulse has a leading edge and a trailing edge, said leading edge occuring substantially immediately after said ignition pulse, said trailing edge occuring after said given time delay interval following said leading edge, wherein said one shot monostable multivibrator circuit input is triggered by said trailing edge of said timing pulse and substantially immediately outputs said trigger pulse.

3. The invention according to claim 2 wherein said trigger pulse has a leading edge and a trailing edge, said leading edge of said trigger pulse actuating said switch circuit to said given state, said trailing edge of said trigger pulse actuating said switch circuit to a second given state, one of said given states of said switch circuit being conductive such that said switch circuit conducts current therethrough from said battery circuit, the other of said given states of said switch circuit being nonconductive such that said switch circuit blocks current flow therethrough from said battery circuit, to provide a first battery circuit voltage at said node during said first given state of said switch circuit, and a second battery circuit voltage at said node during said second given state of said switch circuit, and comprising means for controlling the time duration between said leading and trailing edges of said trigger pulse according to engine rpm such that both said leading edge and said trailing edge of said trigger pulse occur between successive ignition pulses such that following an ignition pulse said switch circuit transitions to said first given state and then transitions to said second given state before occurence of the next ignition pulse such that said battery circuit voltage at said node transitions from said second battery circuit voltage to said first battery circuit voltage and then back to said second battery circuit voltage between successive ignition pulses.

4. The invention according to claim 3 wherein said switch circuit comprises a transistor which is conductive in said first given state and nonconductive in said second given state, such that battery circuit voltage at said node transitions twice for each ignition pulse.

5. The invention according to claim 4 wherein said node is between said transistor and said battery circuit, and battery circuit voltage at said node decreases in response to said first given state of said transistor and increases in response to said second given state of said transistor.

6. The invention according to claim 4 wherein the time duration between said leading and trailing edges of said timing pulse is an order of magnitude larger then the time duration between the leading and trailing edges of said trigger pulse.

7. The invention according to claim 4 wherein said battery circuit has a battery of a given rated voltage, and wherein voltage at said node transitions between ground and a voltage which is less than said given rated voltage, such that said conditioning circuit enables the use of a tachometer rated for voltages less then said given rated voltage of said battery, and converts ignition pulses from said coil for use with said tachometer.

* * * * *